United States Patent
Narayana et al.

[15] 3,689,596
[45] Sept. 5, 1972

[54] IMPACT RESISTANT STYRENE-MALEIC ANHYDRIDE/HYDROXYLATED DIENE BLOCK COPOLYMER COMPOSITIONS

[72] Inventors: Munisamappa Narayana, Midland, Mich. 48640; Jerry E. Mason, Hemlock, Mich. 48626

[73] Assignee: The Dow Chemical Company, Midland, Mich.

[22] Filed: April 19, 1971

[21] Appl. No.: 135,377

Related U.S. Application Data

[63] Continuation-in-part of Ser. No. 847,395, Aug. 4, 1969, abandoned.

[52] U.S. Cl............260/876 B, 260/23.7 M, 260/836, 260/880 B
[51] Int. Cl............................C08f 29/36, C08f 33/08
[58] Field of Search..........................260/876 B, 836

[56] References Cited
UNITED STATES PATENTS

| | | | |
|---|---|---|---|
| 3,462,516 | 8/1969 | Smith et al. | 260/836 |
| 3,417,045 | 12/1968 | Henson et al. | 260/836 |
| 3,555,112 | 1/1971 | Winkler | 260/876 |
| 3,607,977 | 9/1971 | Taylor et al. | 260/876 |

*Primary Examiner*—Samuel H. Blech
*Attorney*—Griswold & Burdick, H. L. Aamoth and A. R. Lindstrom

[57] ABSTRACT

A plastic composition with a good balance of physical properties especially having improved impact and high heat distortion is prepared by intimately mixing from about 15 to 50 weight percent of a partially hydroxylated diene block copolymer with about 85 to 50 weight percent of an anhydride containing thermoplastic such as a styrene-maleic anhydride copolymer.

4 Claims, No Drawings

IMPACT RESISTANT STYRENE-MALEIC ANHYDRIDE/HYDROXYLATED DIENE BLOCK COPOLYMER COMPOSITIONS

REFERENCES

This application is a continuation-in-part of U.S. application Ser. No. 847,395 filed on Aug. 4, 1969, now abandoned.

BACKGROUND OF THE INVENTION

This invention relates to high heat distortion, high impact thermoplastic compositions. In particular it relates to styrene containing thermoplastics. High impact polystyrene compositions are known, but polystyrene is notably deficient in its resistance to elevated temperatures and to certain solvents. To overcome these deficiencies, polystyrene has been modified by copolymerizing styrene with a comonomer such as acrylonitrile and the like but it has proven difficult to improve one property without detracting from another. Additionally the comonomers greatly alter the compatibility of the rubber modifiers with the thermoplastic resin making it difficult to blend or mill the two components together.

One comonomer which greatly improves the heat distortion of a styrene copolymer is maleic anhydride and like monomers. However, styrene-maleic anhydride copolymers have poor impact properties, and attempts to improve the impact strength by blending rubber modifiers therewith give erratic and unpredictable results when the compatability problems can be overcome. It is proposed in U.S. Pat. No. 2,914,505 to blend a nitrile rubber with a terpolymer of styrene-acrylonitrile-maleic anhydride, yet even with a common monomer (acrylonitrile) there is incompatability between the rubber and the terpolymer.

SUMMARY OF THE INVENTION

Unexpectedly, in view of these problems in improving the impact properties of styrene-maleic anhydride and like thermoplastics, it has been found that both improved impact and high heat distortion properties can be obtained by incorporating with said thermoplastic a partially hydroxylated diene block copolymer containing from about 2 to 8.5 weight percent oxygen essentially present as hydroxyl groups. The diene block copolymer contains in polymerized form about 60 to 90 weight percent of a conjugated diolefin and about 10 to 40 weight percent of an alkenyl aromatic monomer. Hydroxylation is accomplished by reacting the block copolymer with an aqueous organic peracid or with an aqueous mixture of hydrogen peroxide and an organic acid.

The advantageous properties obtainable with the hydroxylated block copolymer anhydride thermoplastic compositions of this invention depend on combining from about 15 to 50 weight percent of said hydroxylated block copolymer with from about 85 to 50 weight percent of the anhydride thermoplastic. The properties further depend on utilizing an anhydride thermoplastic polymer containing in polymerized form about 5 to 30 weight percent of an unsaturated dicarboxylic acid anhydride.

DETAILED DESCRIPTION OF THE INVENTION

Diene block copolymers which may be hydroxylated for use in this invention are well known as well as their methods of preparation. Useful block copolymers contain about 10 to 40 weight percent of an alkenyl aromatic monomer and about 90 to 60 weight percent of a conjugated diolefin (a diene).

Suitable conjugated diolefins (dienes) include butadiene, isoprene, 2,3-dimethyl butadiene, piperylene, 2-methyl-3-3-ethyl butadiene, chloroprene, hexadiene-1,3, heptadiene-1,3, octadiene-1,3, and various other alkyl- and aryl-substituted diolefins. Usually and preferably butadiene is employed as the diolefin. It is permissable to employ mixtures of diolefins in place of a single diolefin. Alkenyl aromatic monomers include styrene, vinyl toluene, α-methyl styrene, t-butyl styrene, chlorostyrene and other alkyl or halogenated styrene monomers. Preferably said block copolymer is prepared from styrene and butadiene.

The preparation of diene block copolymers is well known and in general employs an organic-metallic catalyst or initiator such as n-butyl lithium and the like. The polymerization is usually run in an inert solvent. Typical of the block copolymers are the AB and ABA types where B is essentially a polymer block of a conjugated diolefin and A is essentially a polymer block of the alkenyl aromatic monomer. Further more detailed description of methods of preparing said block copolymers may be found in U.S. Pat. Nos. 3,390,207; 3,231,635; 3,265,765; 3,030,346; and in numerous other patents and publications.

The molecular weight of the block copolymer may vary widely, however the lower molecular weight block copolymers are preferred because they are more readily blended with the thermoplastic polymer. Preferred block copolymers have an inherent viscosity of about 1.3 to 3.7 but copolymers with lower viscosities may be employed.

It is important to this invention to partially hydroxylate the diene block copolymer to introduce hydroxyl groups. Hydroxylation, for the purposes of this invention, may be easily determined as the weight percent of oxygen contained in said block copolymer. The hydroxylated diene block copolymer should contain about 2 percent oxygen to provide the necessary compatability with the anhydride thermoplastic. Complete hydroxylation is undesirable because the rubber becomes too brittle to impart impact properties. Accordingly the upper limit of hydroxylation should be controlled to about 8.5 percent oxygen. This range of oxygen content is related to the glass transition temperature which should be no more than about 0° C for good low temperature impact properties and preferably no more than about −10° C.

The hydroxylation reaction itself, is a well known reaction which has been used to introduce epoxide groups when the reaction is run in a non-aqueous medium. However, the reaction may also be conducted with aqueous, acidic epoxidizing agents (hydroxylating agents) which results in a larger proportion of hydroxyl groups due to further reaction of oxirane groups with the water present. For this invention the aqueous hydroxylation reaction is employed producing a hydroxylated copolymer in which the added oxygen is present essentially as hydroxyl groups.

Diene block copolymers are hydroxylated by the reaction of aqueous peracids such as peracetic acid or perbenzoic acid or an aqueous mixture of hydrogen peroxide with an acid such as formic acid, acetic acid, benzoic acid and the like. The aqueous peracids readily react with the ethylenic unsaturation in the diene portion of the block copolymer to form hydroxyl groups.

The hydroxylation reaction may be carried out by dissolving the diene block copolymer in an inert, nonpolar solvent such as benzene, toluene and the like and adding an appropriate amount of an aqueous peracid. The reactants may be allowed to react at room temperature or elevated temperatures may also be used advantageously. Temperatures of about 20° to 50° C have particularly been found useful. The hydroxylated copolymer may then be recovered by separating it from the solvent.

The peracid hydroxylation reaction has been described in the literature such as in "Synthetic Organic Chemistry" by R. B. Wagner and H. D. Zook, John Wiley, New York (1953) especially at pages 179 (Method 107), 172 (Method 98) and 254 (Method 126). Additional references to such reactions may be found in U.S. Pat. No. 2,792,382 and U.S. Pat. No. 2,932,627 as well as in other available technical journals and patents.

The styrene-maleic anhydride and like thermoplastic resins comprise in polymerized form from about 5 to 30 weight percent of an unsaturated dicarboxylic acid anhydride and from about 95 to 70 weight percent of a monovinyl aromatic monomer. Suitable anhydrides include maleic anhydride, itaconic anhydride, citraconic anhydride, aconitic anhydride and the like. Aromatic monomers include styrene, vinyl toluene chlorostyrene, α-methyl styrene, t-butyl styrene, dichlorostyrene and the like. Mixtures of said monomers may also be used. Preferably the thermoplastic is a copolymer of styrene-maleic anhydride.

Various methods are known whereby said thermoplastic copolymer may be prepared. Non-equimolar copolymers such as described above, are readily prepared by a continuous process such as described in U.S. Pat. No. 2,769,804. Preferably, the thermoplastic is a homogeneous, essentially gel free copolymer prepared according to U.S. Pat. No. 3,336,267 wherein the copolymer is essentially optically transparent, having optical transmissions above about 80 percent and wherein at least 90 percent of the copolymer has an anhydride composition within a range of about 5 percent as determined by fractionation analysis. Further evidence of homogeneity and absence of gels in the copolymer is found in the fact that no filtering of solutions of the copolymer is necessary before making viscosity determinations and that melt index determinations give rise to uniform, gel-free strands. The copolymer should also have a viscosity of at least about 2 cps (measured as a 10 percent by weight solution in methyl ethyl ketone at 25° C) and preferably a viscosity of about 4 to 12 cps.

Mixing of the hydroxylated diene block copolymer and the thermoplastic copolymer may be accomplished in different ways, but usually includes a step where the components are mechanically worked at a temperature high enough to plasticize the mass, such as by milling on a roll mill, or an internal rotating blade mixer of the Banbury type or by compounding in a Meili mixer. The temperature of mixing will vary depending on the thermoplastic copolymer composition, but temperatures in the range of 160° C to about 200° C and higher have been found adequate.

An alternate method of mixing which may be utilized is to dissolve both the hydroxylated diene block copolymer and the thermoplastic in an inert solvent and heat under reflux for several hours. The solvent is then removed and the mixture may be further mechanically worked if desired. While there is no intent to be held to this explanation it is theorized that the compatability of this mixture and the resultant beneficial properties thereof may be due to an esterification reaction between the hydroxyl groups and the anhydride group of the thermoplastic.

To obtain a good balance of other physical properties such as tensile strength and modulus as well as improved impact and high heat distortion the compositions of this invention may contain from about 15 to 50 weight percent of the hydroxylate diene block copolymer and from about 85 to 50 weight percent of the anhydride containing thermoplastic polymer.

The invention will be further illustrated by the following non-limiting examples in which all parts and percentages are by weight unless otherwise specified.

EXAMPLE 1

A solution of 100 gms of a styrene/butadiene, 40/60, block copolymer (AB Type; inherent viscosity 1.3) in benzene was prepared according to the method of U.S. Pat. No. 3,030,346. The solution was then heated under a nitrogen atmosphere to 40°–45° C and with stirring 95 gms of a solution of 25 gms of a 30 percent aqueous hydrogen peroxide solution in 70 gms of aqueous formic acid (80 percent) was added dropwise. Following addition of the peroxide solution the mixture was heated an additional hour at 50° C. The hydroxylated block copolymer was then precipitated by the addition of methanol, washed and dried at 50°–60° C for 24 hours under vacuum with purging of the vacuum oven with nitrogen before drying. The hydroxylated block copolymer contained about 4 percent by weight oxygen. Infrared analysis confirmed the disappearance of butadiene double bonds and identified the presence of hydroxyl groups. No evidence of epoxide groups was found.

Various proportions of this hydroxylated styrene/butadiene block copolymer were combined with a styrene-maleic anhydride (82/18) polymer and properties of the mixtures determined. The results are shown in Table I.

The results show that high heat distortion (Vicat temperature) was maintained even at a 50 percent hydroxylated copolymer level and improved impact properties were obtained in all cases. There is a normal decrease in tensile strength as the rubber content increases but the tensile strengths are still useful.

TABLE I

| % | | Method of | Properties (3) | | |
|---|---|---|---|---|---|
| SMA | SB () | Mixing (2) | Tensile, psi | Impact ft-lbs./in | Vicat Temp °C |
| 100 | 0 | — | 5230 | 0.24 | 140 |
| 82 | 18 | A | 4640 | 0.74 | 141 |
| 82 | 18 | B | 3552 | 0.74 | 138 |

| | | | | | |
|---|---|---|---|---|---|
| 18 | | A,D | 3792 | 0.90 | 139 |
| 73 | 27 | B | 3360 | 1.14 | 138 |
| 73 | 27 | A,D | 3040 | 1.23 | 140 |
| 64 | 36 | A | 2461 | 0.87 | 140 |
| 64 | 36 | B | 2928 | 1.63 | 138 |
| 64 | 36 | A,D | 2400 | 1.72 | 138 |
| 64 | 36 | A,C | 2292 | 1.51 | 135 |
| 64 | 36 | A,C,D | 1770 | 2.41 | 136 |
| 50 | 50 | B | 1476 | 5.88 | 123 |
| 50 | 50 | A,D | 2029 | 4.55 | 133 |

(1) SB—hydroxylated styrene-butadiene block copolymer
(2) Method A—compounded on a 2-roll Thropp Mill with a front roll temperature of 400°F and a real roll temperature of 200–300°F. Loading time was 15–30 minutes with a blending time of 5 minutes.
Method B—compounded in a Meili Mixer at 200–300°F for 7 minutes
Method C—components prereacted in solution
Method D—1% butyl stearate added
(3) Compression molded samples; melt time 4–6 minutes; time at 30 tons pressure, 2–4 minutes; cooling time 15 minutes; temperature 215°–250°C.

EXAMPLE 2

To illustrate that the improvements and benefits of this invention are not obtained unless a hydroxylated diene block copolymer is used, the styrene/butadiene, 40/60, block copolymer without any hydroxylation treatment was combined with the same SMA thermoplastic polymer and properties determined.

TABLE II

| | | | | Properties | |
|---|---|---|---|---|---|
| % SMA | % SB* | Method of Mixing | Tensile, psi | Impact ft-lbs/in | Vicat Temp °C |
| 82 | 18 | A | 3050 | 0.51 | 141 |
| 64 | 36 | A | 1700 | 0.66 | 140 |
| 50 | 50 | B | 920 | 1.69 | 111 |
| 50 | 50 | A,D | 1120 | 1.67 | 101 |

*No hydroxylation treatment

The balance of physical properties is not found in these unhydroxylated copolymer/thermoplastic mixtures and they are generally poorer when compared at a comparable rubber level to the previous results. At the high rubber level, even though the impact properties are improved, the heat distortion and tensile values are greatly depressed.

EXAMPLE 3

Tests were made with styrene-maleic anhydride copolymers with varying maleic anhydride content using the hydroxylated block copolymer of Example 1. The mixtures were all prepared by compounding on a two roll Thropp mill with a front roll temperature of 400° F and a rear roll temperature of 200°–300° F. Loading time ranged from 15–30 minutes with a blending time of 5 minutes. (See Table III).

TABLE III

| SMA % MA | Components, gms | | | Tensile psi | Properties Impact ft-lb/in | Vicat Temp °C |
|---|---|---|---|---|---|---|
| | Visc. | SMA | SB | | | |
| 5 | 4.0 | 133.3 | 66.7 | 2600 | 3.72 | 109 |
| 18 | 4.0 | 133.3 | 66.7 | 3180 | 1.18 | 134 |
| 25.4 | 3.96 | 133.3 | 66.7 | 3620 | 0.92 | 150 |
| 33.3 | 4.07 | 133.3 | 66.7 | | unworkable | |

EXAMPLE 4

A commercially available styrene-butadiene random block copolymer containing about 25 percent styrene (Tufdene 200R, Asahi Chemical Industries) was hydroxylated in a manner similar to Example 1.

This hydroxylated copolymer (5.4 percent oxygen) was blended with a styrene-maleic anhydride (82/18) copolymer to contain about 20 weight percent block copolymer. The resultant blend had an impact of about 0.88 ft-lb/in notch (more than a three fold improvement over the SMA copolymer itself).

EXAMPLE 5

To illustrate the effect of the percent oxygen in the hydroxylated diene block copolymer to the glass transition temperature, the styrene-butadiene block copolymer of Example 1 was hydroxylated to varying degrees and the glass transition temperature (GTT) determined.

TABLE IV

| % Oxygen | GTT, °C |
|---|---|
| 0 | about −75 |
| 5.37 | −22 |
| 8.13 | −10 |
| 10.1 | +15 |
| 16.1 | +29 |
| 16.4 | +60 |

It can be seen that above about 8.5 weight percent oxygen the hydroxylated copolymer becomes too brittle to provide useful impact properties, especially low temperature impact resistance. The glass transition temperature was determined by a standard Torsion Pendulum Test which is described in Chapter 7 at page 138 of "Mechanical Properties of Polymers" by L. E. Nielsen, Reinhold Publishing Corp., N. Y. (1962).

Additives for various other purposes, decorative as well as functional, may be combined with the impact resistant compositions of this invention. Such additives include colorants, pigments stabilizers, mold release agents, inert fillers, lubricants, reinforcing fibers and materials, and the like.

It will be understood that the present invention is not limited to the specific materials, steps and other specific details described above but may embody various modifications insofar as they are defined in the following claims.

What is claimed is:

1. An impact resistant thermoplastic composition prepared by blending about 15 to 50 weight percent of a partially hydroxylated diene block copolymer containing from about 2 to 8.5 weight percent oxygen essentially present as hydroxyl groups and about 85 to 50 weight percent of a thermoplastic polymer; wherein said thermoplastic polymer contains in polymerized form about 5 to 30 weight percent of an unsaturated dicarboxylic acid anhydride and about 95 to 70 weight percent of a monovinyl aromatic monomer and wherein said hydroxylated diene block copolymer is prepared by reacting a diene block copolymer of about 10–40 weight percent of a monovinyl aromatic monomer and about 60 to 90 weight percent of a conjugated diolefin with an aqueous organic peracid or an aqueous mixture of hydrogen peroxide and an organic acid.

2. The thermoplastic composition of claim 1 wherein said anhydride is maleic anhydride.

3. The thermoplastic composition of claim 1 wherein the thermoplastic is a copolymer of styrene-maleic anhydride.

4. The thermoplastic composition of claim 1 wherein said diene block copolymer has an inherent viscosity of about 1.3 to 3.7.

* * * * *

PO-1050
(5/69)

UNITED STATES PATENT OFFICE
CERTIFICATE OF CORRECTION

Patent No. 3,689,596            Dated September 5, 1972

Inventor(s) Munisamappa Narayana

It is certified that error appears in the above-identified patent and that said Letters Patent are hereby corrected as shown below:

Column 2, line 11, delete second "3-" which appears before "ethyl."

Column 4, line 63, in Table I, "%" sign should be above both "SMA" and "SB(1)".

Column 4, line 64, in Table I, delete "()" after "SB" and insert --(1)--.

Column 5, line 1, in Table I, number "18" in first column should be --82-- and the number --18-- should be inserted as the first number in the second column which is now blank.

Column 5, line 31, in Table II, "%" sign should be above both "SMA" and "SB*".

Signed and sealed this 20th day of February 1973.

(SEAL)
Attest:

EDWARD M. FLETCHER, JR.            ROBERT GOTTSCHALK
Attesting Officer                       Commissioner of Patents